June 16, 1931.  L. W. JOHNSON  1,810,214
ALIGNING FIXTURE
Filed Feb. 11, 1927  2 Sheets-Sheet 1
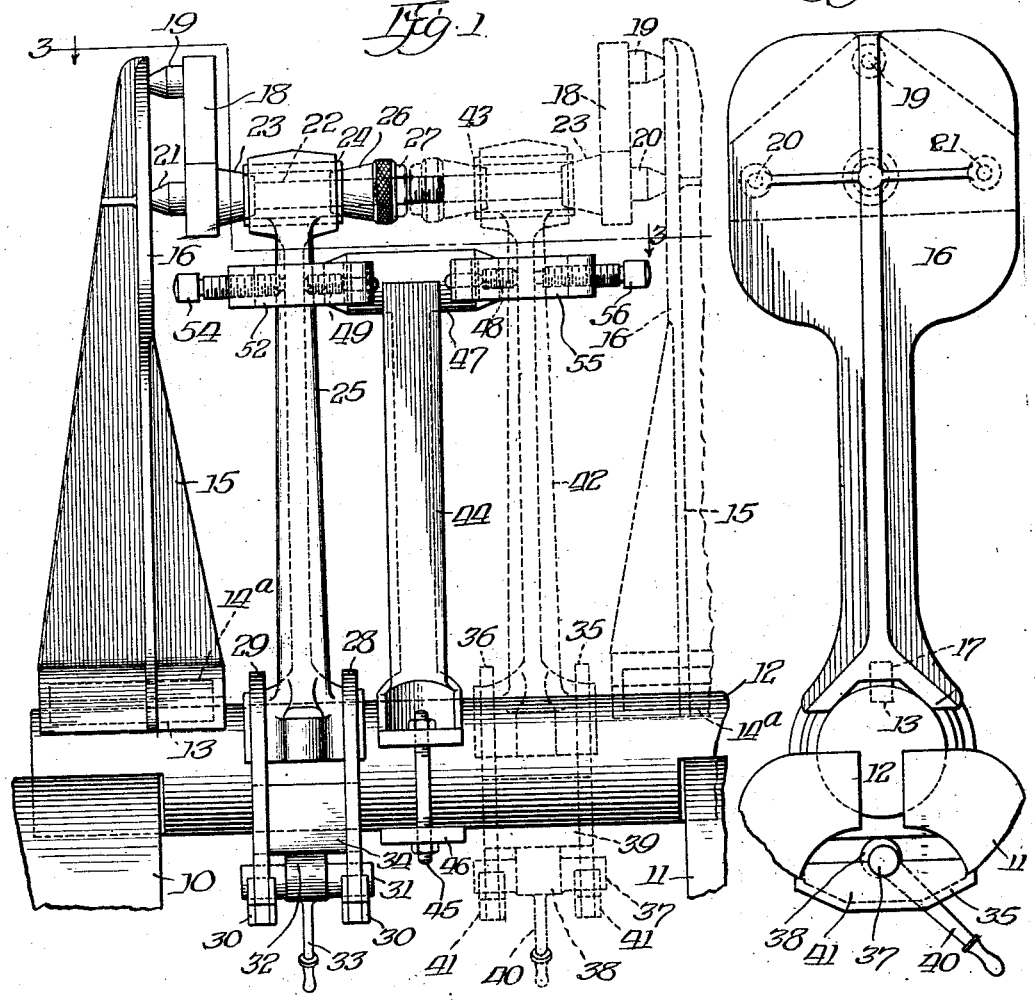
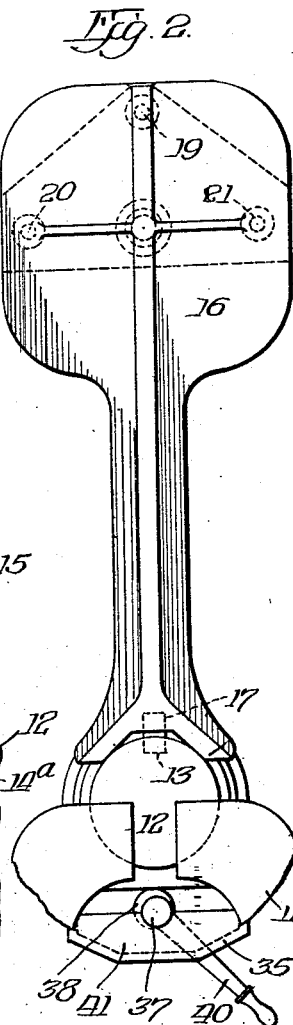
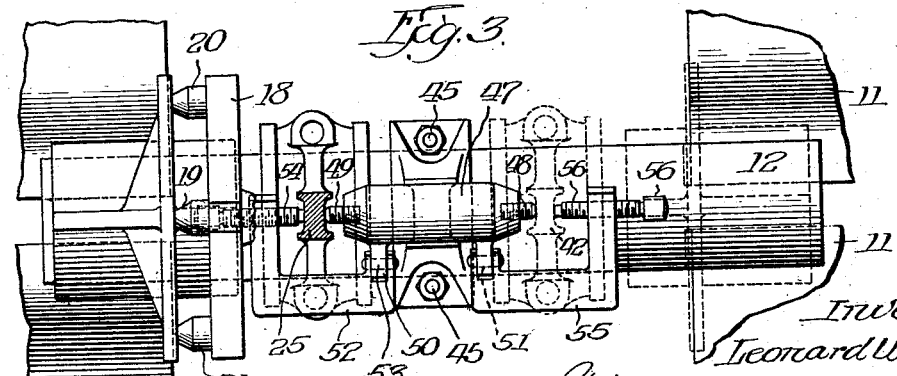

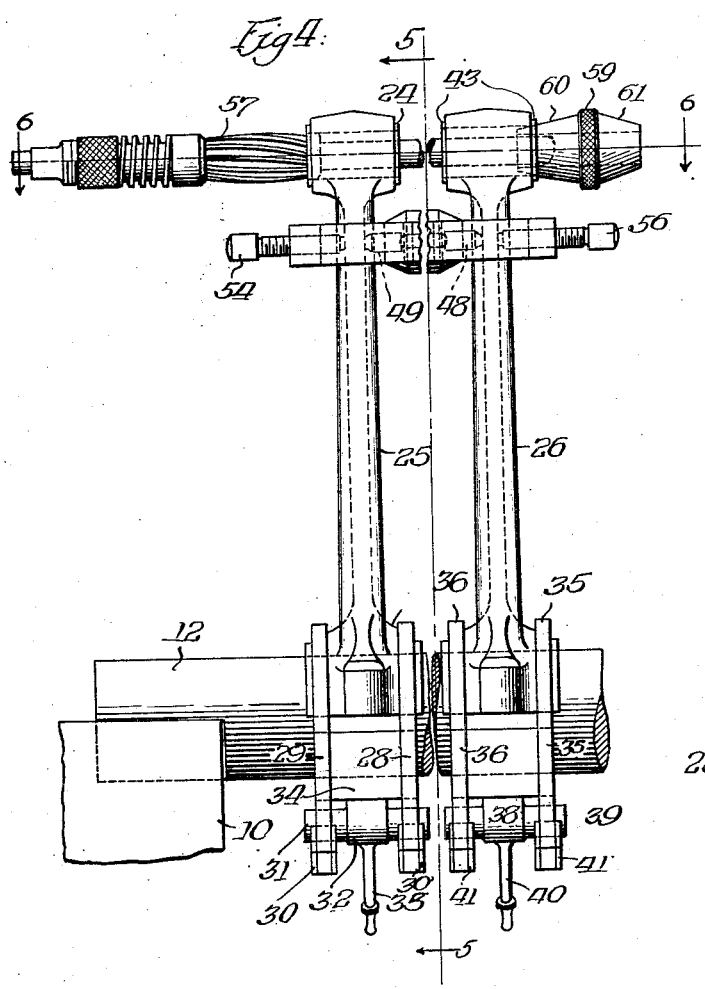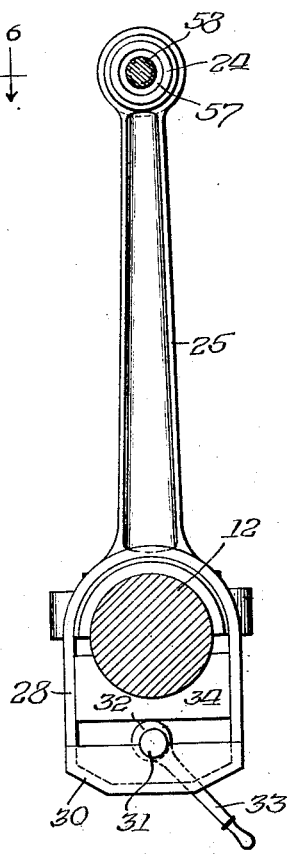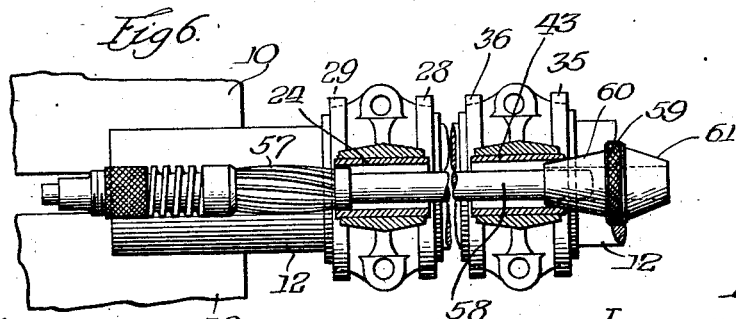

Patented June 16, 1931

1,810,214

UNITED STATES PATENT OFFICE

LEONARD W. JOHNSON, OF BATAVIA, ILLINOIS

ALIGNING FIXTURE

Application filed February 11, 1927. Serial No. 167,574.

My invention relates to an aligning fixture for use in aligning and reaming bearings and has particular reference to a fixture for use in aligning the connecting rods of automobiles for reaming out the bearings in such manner that the bearings at each end of the connecting rods have parallel centers.

Another and further object of my invention is the provision of an aligning fixture for the aligning of a pair of connecting rods prior to the reaming out of the bearings in the connecting rods, so that the centers of the bearings will be in alignment with each other, and to hold the connecting rods in aligned position during the reaming of the bearings.

In the placing of new bearings in the connecting rods of automobiles it is necessary to have the centers of the bearing, by means of which the rod is connected to the piston head and the bearing at the opposite end of the connecting rod which is connected to the crank shaft, in exact alignment with each other in order that the bearings at each end of the connecting rod may fit properly because if they are too tight they become heated, resulting in the melting out of the bearings and if they are too loose this looseness produces a knock in the engine of the motor which is undesirable and which also causes an unnecessary wearing of the bearings and an unnecessary shock to the motor.

It is necessary during the life of an automobile to frequently renew the bearings at each end of the crank shaft and to rebore the bearings and tighten them up frequently in order to secure proper operation of the motor. These connecting rods operate in pairs and it is therefore necessary to have each pair of connecting rods properly aligned in order to secure proper fit upon the wrist pins in the piston heads at one end of the connecting rods and upon the crank shaft at the other, and my invention has to do primarily with the aligning of the bearings in the connecting rods prior to their being reamed to the proper size to fit the wrist pins in the piston heads and also for the purpose of truing up old bearings after they have been in service.

Another and further object of my invention is the provision of an aligning fixture by means of which the connecting rods are tested, that is as to proper alignment of the bearings, and also to determine whether the connecting rods are straight, as they sometimes twist or bend in service due to internal stresses in the metal and the heat of the automobile engine in service.

Another and further object of my invention is the provision of an aligning fixture which performs the double function of enabling the connecting rods to be properly aligned and to hold the rods in their aligned positions while the bearings in one end of the connecting rods are being reamed out.

These and other objects of my invention will be more fully understood by reference to the accompanying sheet of drawings, in which:—

Figure 1 is a side elevational view of my improved fixture;

Figure 2 is an end elevational view;

Figure 3 is a cross sectional view on lines 3—3 of Figure 1;

Figure 4 is a side elevational view showing the connecting rods secured to the fixture in position for the reaming operation;

Figure 5 is an end view, partially in elevation and partially in section, on lines 5—5 of Figure 4; and Figure 6 is a cross sectional view on lines 6—6 of Figure 4 showing the reamer in aligned position in the bearings.

Referring now specifically to the drawings and in which like reference characters refer to like parts throughout, I provide a pair of blocks 10 and 11 with a round shaft 12 mounted therein in any suitable manner, the said shaft 12 being the same diameter as the crank shaft to which the connecting rods are adapted to be secured, and has key-ways 13 and 14 in the upper side thereof within which a key 14a is adapted to seat for the purpose of holding the aligning fixture in proper relation with the shaft 12. A vertical member 15 is provided having a head portion 16 at its upper end with a plane surface on one side thereof which is parallel with the transverse axis of the shaft 12, when the member 15 is in proper position on the shaft 12. The lower end of the member 15 has a V-shaped bearing surface adapted to rest upon the shaft 12, and has a key-way 17 formed therein adapted to receive the key 14a so the plane surface of the head 16 is held in proper position for the gauging of the connecting rods and for aligning the bearings. A second gauge member is provided having a somewhat triangular shaped head 18 which has three contact studs 19, 20 and 21 thereon equal in length and having a shaft portion 22 extending outward from a tapered projection 23, the shaft 22 being adapted to extend through a wrist pin bearing 24 in a connecting rod 25 as shown. The width of the head 18 at its widest portion is the same as the head 16. A tapered bushing 26 is provided having a longitudinal opening therethrough adapted to receive the shaft 22 which has a nut 27 on the outer end thereof and in threaded engagement therewith. The tapered surface of the bushing 26 preferably corresponds in inclination to the tapered surface of the projection 23, although this is not necessary.

A pair of clamping loops 28 and 29 are provided which are adapted to hold the connecting rod 25 on the shaft 12 and which have a pair of filler blocks 30, 30 therein with a shaft 31 extending into each of the said loops, the shaft 31 having an eccentric portion 32 with a handle 33 secured thereto intermediate the ends of the said pin, with a clamping member 34 being provided, this combination providing means by which the connecting rod 25 is clamped to the shaft 12. A second clamping device is provided comprising a pair of loops 35 and 36 with a pin 37 therein having an eccentric portion 38, a clamping member 39, a handle 40 and a pair of filler blocks 41, 41, this clamping device being a duplicate of the one heretofore described, whereby a second connecting rod 42 is clamped to the shaft 12. Other clamps may be provided should it be advisable to align and ream more than two connecting rods at the same time. The connecting rod 42 has a wrist pin bearing 43 at the upper end thereof similar to the bearing 24 in the connecting rod 25.

A support member 44 is provided in order to hold the connecting rods 25 and 42 in position during the reaming operation, which is clamped around the shaft 12 at one of its ends by a pair of bolts 45, 45 and a clamping member 46, the member 44 having a T head 47 at its upper end in the outer ends of which a pair of threaded members 48 and 49 are placed adapted to contact with the adjacent sides of the connecting rods 25 and 42 respectively. The head 47 at one of the sides has a pair of projections 50 and 51 thereon, the projection 50 having an angle member 52 secured thereto by a pin 53 with a threaded bolt 54 in the outer end thereof adapted to engage the connecting rod 25.

An angle member 55 is secured to the T head 47 at its opposite side with a threaded bolt 56 in the outer end thereof, connecting rods 25 and 42 being held between the bolts 49 and 54 and 48 and 56 respectively, which are properly adjusted after the connecting rods are aligned and are held against vibration during the reaming operation.

In operation, when it is desired to place a pair of connecting rods in position on the device for reaming out or trueing up the bearings in the upper ends of the connecting rods 25 and 42, the connecting rod 25 is placed in position on the shaft 12, the loops 28 and 29 are placed in position over the ends of the rod 25 and the connecting rod clamped by the eccentric portion 32 of the pin 31 and the member 34 onto the shaft 12 and held in loose position thereon, the shaft 12 being of the same size as the crank shaft, and the connecting rod 25 therefore being placed in the same relative position on the device as it occupies when connected to the motor, the degree of tightness being controlled by the handle 33. The second gauge member is thereupon placed in position with its shaft 22 extending through the bearing 24 and is clamped in position by the nut 27. The member 15 is thereupon placed in position on the shaft 12 and a straight edge applied to the side of the head 16 and the side of the triangular shaped head 18 to determine whether the connecting rod 25 is bent and also to properly center the head 18 with respect to the head 16 on the gauge member 15. The member 15 is also brought up into contact with the members 19, 20 and 21 and any twist in the connecting rod can be immediately determined by comparing the position of the members 19, 20 and 21 with the contact they make on the face of the member 16. As soon as this condition of the connecting rod has been determined and the connecting rod properly centered, the screws 49 and 54 in the member 44 are adjusted so as to hold the connecting rod 25 in permanent position in which it was aligned by use of the gauge members. Thereupon a second connecting rod 42 is secured to the shaft 12 in the same manner as the connecting rod 25 is secured to the shaft and the same operations gone through with respect to this member, as has been described with reference to the connecting rod 25, the member 15 having been moved around to the opposite end of the shaft 12 and the connecting rod 42 aligned in precisely the same manner as has been heretofore described with respect to the connecting rod 25. In this manner it will be understood that the centers of the bearings 43 and 24 in the ends of the connecting rods 42 and 25 respectively, are aligned with each other and are also aligned with the center of the bearings at the opposite end of the connecting rod, which are adapted to engage the crank shaft.

In Figures 4, 5 and 6, the method of reaming out the wrist pin bearings is illustrated. The aligning fixtures 15 and 18 are removed, a reamer 57 is placed in the bearing 24 having a shaft 58 projecting therefrom and into a tapered bushing 59 having a pair of tapered surfaces 60 and 61 for convenience in use. The reamer 57 is forced through the bearing 24 and is then removed and placed into the bearing 43 from the opposite side, the shaft 58 projecting through the reamed bearing 24 and having the taper bushing 59 placed into engagement with the reamed bearing 24, thus properly centering the reamer 57 and keeping the centers of the bearings 24 and 43 in alignment with each other. The bearing 43 is thereupon reamed out, so that when the operation is complete, each of the bearings 24 and 43 are the same diameter and their longitudinal axes are in alignment, and the longitudinal axes of these bearings are parallel to the longitudinal axes of the crank shaft bearings at the opposite end of the connecting rods.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

A fixture for aligning a pair of engine-connecting-rods preparatory to reaming the wrist pin openings thereof, comprising in combination a base member having an intermediate portion shaped to be received in the terminal crank shaft bearings of the engine-connecting-rods to be reamed, means adjustably mounted upon the intermediate portion of said base member and provided at opposite sides with means for engagement with respective connecting-rods for adjustably clamping said rods on the base member at right angles thereto, a gauge member provided at one end with a clamping seat to selectively receive either end portion of the base member and provided at its other end with a gauge face disposed at right angles to the base member, and a second gauge member for interposition between the said gauge face and the adjacent connecting-rod, said second gauge member being provided upon one side with a set of gauge projections for engagement with said gauge face and on its opposite side with a gauge projection to enter the wrist pin opening of the adjacent connecting-rod and locate said wrist pin opening vertical to said gauge face portion.

Signed at Chicago, Illinois, this 9th day of February, 1927.

LEONARD W. JOHNSON.